Oct. 3, 1967   L. F. JUMELLE ET AL   3,344,883
SILENCERS FOR JET PROPULSION ENGINES OR THE LIKE
Filed July 11, 1966   2 Sheets-Sheet 1
Fig.: 1a
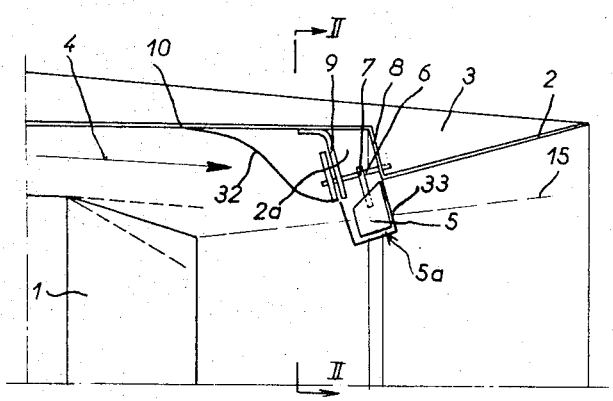
Fig.: 1b
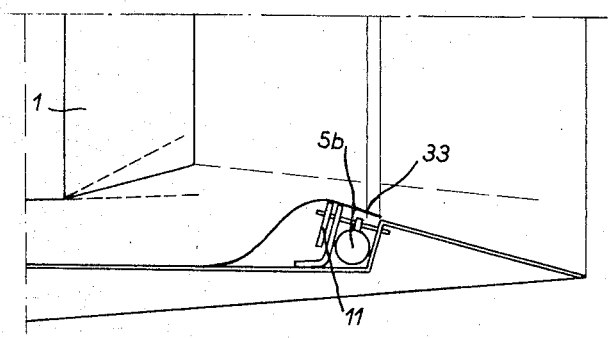

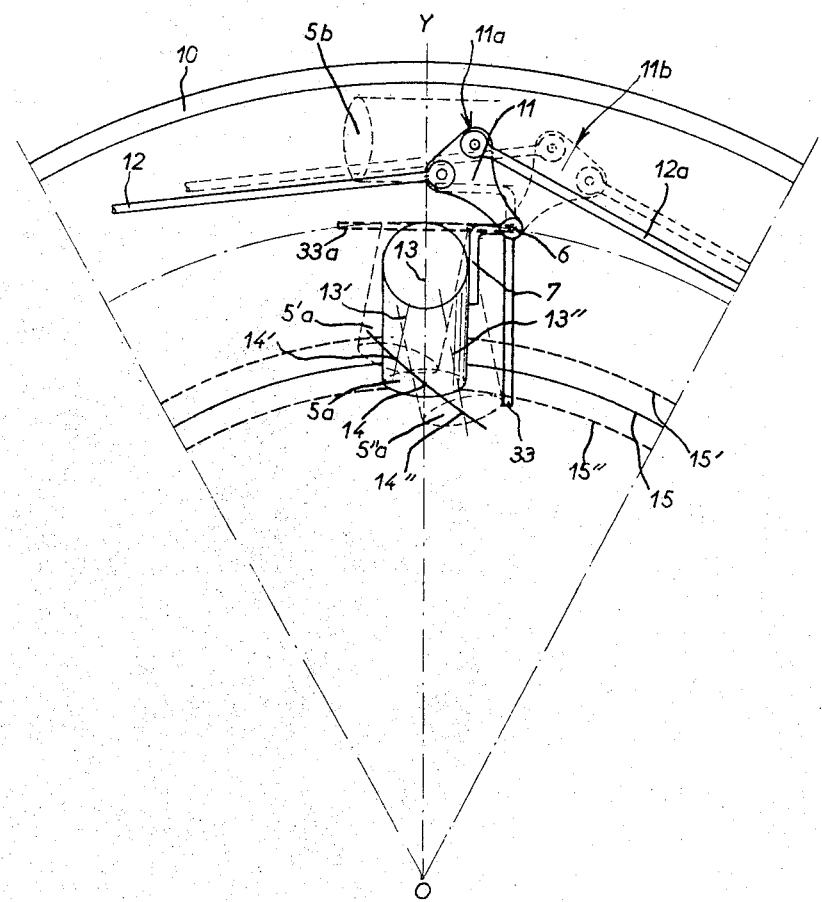
Fig.:2

United States Patent Office 3,344,883
Patented Oct. 3, 1967

3,344,883
SILENCERS FOR JET PROPULSION ENGINES OR THE LIKE
Louis François Jumelle, Paris, Gaston Jean-Louis Ranvier, Issy-les-Moulineaux, and Gerhard Richter, Dammarie-les-Lys, France, assignors to Societe Nationale d'Etude et de Construction de Moteurs d'Aviation, Paris, France, and Office National d'Etudes et de Recherches Aerospatiales dit: O.N.E.R.A., Bagneux, Seine, France
Filed July 11, 1966, Ser. No. 564,148
Claims priority, application France, July 28, 1965, 26,391
3 Claims. (Cl. 181—51)

It is known to reduce the noise of jet propulsion engines of aircraft or other jet ejection devices by the use of conduit elements, formed, for example, by tubes or troughs, which open into the jet to the rear of the nozzle, these elements receiving air which they introduce into the jet. The said conduit or silencer elements are advantageously retractable, that is to say means are preferably provided for withdrawing them outside the jet and for masking them behind a fixed structure, so as to reduce or eliminate their drag effect when silencing is not required.

Silencers of this type are described, more particularly, in U.S patent applications Ser. Nos. 386,194, 461,037, and 461,008, filed June 3, 1965, now Patent No. 3,263,931.

In the forms of embodiment described in the said applications means are provided for shifting the silencer elements between an operative position, in which their ends extend into the jet, and an inoperative position in which they are retracted outside the jet.

The present invention has for its object to provide improvements in silencers of this type, which will enable the depth to which the silencer elements penetrate into the jet to be adjusted.

The specification hereinbefore mentioned Ser. No. 461,037 describes a retractable silencer constituted by tube elements distributed at the periphery of a divergent portion or element which is independent of the nozzle proper. In the operative position, tese tube elements are disposed radially so as to penetrate partially into the jet and thus cause a certain deadening of noise. In the inoperative position, the tube elements are folded back laterally and are retracted into the wall of the divergent portion or element, re-establishing the continuity of the latter and consequently eliminating any loss of thrust in flight. The tube elements are mounted so that they can each pivot about an axis the general direction of which is longitudinal with respect to the nozzle, and means are provided to enable them to pivot together, about this axis, between the silencing position and the retracted position. In one form of embodiment described in the said specification, the pivotal axis of each tube element is located in the immediate vicinity of its wall.

The silencer elements mounted in this way, to pivot about substantially longitudinal axes distributed around the jet, may be conduit elements of any suitable form capable of introducing into the jet, air picked up externally. For example they may be constituted by hollow cylindrical or prismatic tubes, which may, moreover, be cut away parallel to their generators to form troughs or channels, or by elements such as bells or lobes.

According to the present invention, the pivotal axis of each silencer element is considerably offset tangentially to the periphery of the jet with respect to the geometrical axis of the element in the operative position, so as to permit a wider degree of adjustment of the penetration of the said elements into the jet.

Whereas in the silencers previously described the position of the pivoting axis of the elements in the jet enabled them to be given, practically speaking, only a single operative position, the improvement according to the present invention, by providing for adjustment of the angle of rotation of each element, enables the depth of penetration of the elements into the jet in the silencing position to be chosen or adjusted so as to adapt it to the conformation of the jet. It will be noted, in fact, that the size of the propulsion jet which is to be silenced varies according to the engine load and, in particular, according to whether the engine is operating with or without reheat. Moreover, deviations in the output of the engine, on the one hand, and deviations in the elementary efficiences of its component parts (hereinafter referred to as the "special arrangement" of the engine) have an effect on the outlet cross-section of the nozzle and therefore on the diameter of the jet opposite the silencer. An increase in the margin of adjustment of the depth of penetration of the silencer elements into the jet, which is permitted by this improvement, is therefore extremely useful.

It is possible to provide control means enabling the silencer elements to be pivoted between their retracted position and one or the other of a plurality of predetermined operative positions, so that the said elements may penetrate into the jet to the desired extent.

The description which follows with reference to the accompanying drawings, which is given by way of non-limitative example, will enable the various features of the invention and the manner of carrying them into effect to be clearly understood, any arrangement appearing both from the text and from the drawings naturally falling within the scope of the said invention, as defined by the appended claims.

In the drawings,

FIGURE 1a is a longitudinal half-section of the end of a nozzle and its silencer, showing one form of embodiment of the invention;

FIGURE 1b is a view similar to FIGURE 1a, showing a silencer element in the retracted position;

FIGURE 2 is a partial section, to an enlarged scale, on the line II—II of FIGURE 1a.

FIGURES 1a, 1b and 2 show a silencer basically similar to that which is illustrated in U.S. patent application Ser. No. 461,037. A convergent primary nozzle 1, rigid with the engine (not shown), can be seen. The divergent portion or element 2, which follows the nozzle, forms part of the structure 3 of the aircraft. In the annular space between the nozzle 1 and the structure 3 there occurs a secondary air flow 4. Tube elements 5 forming the silencer are distributed round the divergent element 2, at the upstream end thereof, in a recess provided for this purpose. They are mounted to pivot about spindles 6 mounted between the front face 8 of the divergent element and a conical ring 9 welded to the inner wall 10 of the structure 3. On the upstream side, the tubes 5 are bevelled, or cut in the form of whistles, in order to facilitate the entry of secondary air 4. Rocking levers or "puppets" 11 enable the tubes to be pivoted about their spindles 6. Each of these "puppets" is linked to its neighbors by connecting rods 12, 12a. A single control means (not shown), for example a jack, permits simultaneous adjustment of all the tubes.

The assembly composed of these tubes and their control means is housed in an annular fairing 32 which is suitably profiled and provided with openings permitting the exit of the tubes 5 into the operative position of the silencer. In the inoperative position, the openings are closed by flaps 33 carried by the tubes 5 and which re-establish the continuity of the fairing 32.

The tube elements 5 are shown in the operative position at 5a in FIGURE 1a and in the inoperative position at 5b in FIGURE 1b. It is apparent, however, that in practice all the tube elements 5 are either in the operative position or in the inoperative position.

It will be seen in FIGURE 2 that, in accordance with the present invention, each tube element 5 is mounted on its spindle 6 by means of a right-angled member 7 rigid with the tube 5 and this enables the axis, defined by the spindle 6, to be offset to a very substantial extent outside the tube 5. The "puppet" 11 is fast with the right-angled member 7, so that when it is actuated by the connecting rods 12, 12a, it pivots about the axis 6 and carries the right-angled member 7 and the tube 5 with it. The tube element is shown in its operative position in solid lines at 5a; the "puppet" is then in the position 11a. In the inoperative position shown in broken lines at 5b, the tube is retracted tangentially into the recess 2a, the "puppet" then being in the position 11b.

As mentioned above, the element 33, carried by the tube 5 makes it possible, in the retracted position (shown at 33a), to establish continuity of the upstream fairing 32 of the divergent portion 2, and even almost to obtain tightness thereof (although this is not absolutely necessary). In another arrangement (not shown), one of the walls of each silencer element forms this continuity element in the retracted position (the silencer elements being then necessarily shaped accordingly).

It will be seen that, owing to the fact that the pivotal axis 6 is considerably offset to the outside of the tube 5, the path of the centre 14 of the downstream end cross-section of the tube, when it pivots about the said axis 6 in the vicinity of its position 5a, is distinctly inclined with respect to that radius O–Y of the jet propulsion unit which passes through the said centre 14. In fact, the centre 14, which is at the intersection of the axis 13 of the tube 5 with the plane of its outlet cross-section, describes a circle centered on the axis 6; the latter being well spaced from the axis 13, which, in the middle operative position 5a of the tube 5 shown in solid lines, coincides with the radius O–Y, in which position this circle is distinctly inclined with respect to the perpendicular to this radius. If, on the other hand, the pivotal axis of the tube 5 were placed in the vicinity of its longitudinal axis 13, the path of the centre 14 would be substantially perpendicular to the radius O–Y and, consequently, the distance from the centre 14 to the axis of the jet would be substantially constant when the tube 5 pivots about its radial position 5a and a considerable movement of the control means 12, 12a of the silencer would only result in a slight variation of this distance. The position of axis 13 and center 14 corresponding to the positions 5'a and 5"a, respectively, of tube 5 are shown at 13', 14' and 13", 14", respectively.

It will therefore be understood that the offsetting of the pivotal axis 6 makes it possible to avoid non-adjustability of this distance and, consequently, to increase the possible depth of penetration of the tube 5 into the jet. It is thus possible to utilize clearly differentiated positions of the controls according to the engine load, so as to adjust the penetration of the tubes into the jet according to the variations of the latter. FIGURE 2 shows in a solid line the cross-section 15 of an average jet at the outlet of the silencer tubes and, in broken lines, the cross-section 15' and 15" of jets which are respectively produced when the engine is operating with reheat and without reheat. To these formations of the jet there correspond the positions 5a (shown by solid lines), 5'a and 5"a (shown in broken lines), respectively, of the tubes 5. A positive control system of the kind which is described in the U.S. patent application Ser. No. 461,037, but enabling the tubes to be brought into the positions 5'a or 5"a, will enable the silencer to be used effectively for two load conditions, for example take-off with or without reheat. The number of possible positions of the tubes is, moreover, not limited to two and it is possible to envisage adapting the silencer position to a larger number of possible formations of the jet.

What we claim is:

1. A silencer device for a jet having at least one inoperative position and at least one operative position for reducing the noise of the jet emitted by a nozzle, comprising (a) a plurality of conduits distributed round the jet and each having an inlet end which is subjected, at least in the operative position, to the ambient pressure adjacent the outer periphery of the nozzle, and an outlet end which, in the operative position, is adapted to penetrate into the jet at a position spaced downstream from the nozzle, and means whereby each conduit is mounted to pivot about an axis having a general direction extending generally longitudinally of the jet, which axis is considerably offset to the outside of the conduit, and (b) control means for pivoting the conduits about their respective pivotal axes between the inoperative position, in which the conduits are fully retracted outside the jet, and the operative position.

2. Device according to claim 1, wherein the pivotal axes of the conduits are disposed along the generators of a cone the surface of which is substantially parallel to the peripheral surface of the jet and outside the latter, and the conduits are substantially rectilinear and, in the inoperative position, are disposed outwardly of the jet with respect to their respective pivotal axes.

3. Device according to claim 1, wherein the control means are adapted to pivot the conduits at will between the inoperative position and any one of a plurality of operative positions in which the outlet end of each conduit respectively penetrates into the jet to different distances from the axis of the latter.

References Cited

UNITED STATES PATENTS

| | | | |
|---|---|---|---|
| 2,997,845 | 8/1961 | Oulianoff | 181—33 |
| 3,027,714 | 4/1962 | Parker | 181—33 |
| 3,263,931 | 8/1966 | Bartek et al. | 181—33 |

RICHARD B. WILKINSON, *Primary Examiner.*

R. S. WARD, *Examiner.*